(12) United States Patent
Koohmarey et al.

(10) Patent No.: US 11,080,490 B2
(45) Date of Patent: Aug. 3, 2021

(54) PRE-TRAINING OF VIRTUAL CHAT INTERFACES

(71) Applicant: ServiceNow, Inc., Santa Clara, CA (US)

(72) Inventors: Darius Koohmarey, Poway, CA (US); Alisson Douglas Da Silveira Pacheco, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 210 days.

(21) Appl. No.: 16/368,659

(22) Filed: Mar. 28, 2019

(65) Prior Publication Data
US 2020/0311208 A1 Oct. 1, 2020

(51) Int. Cl.
*G06F 40/30* (2020.01)
*G06N 3/00* (2006.01)
*G10L 15/18* (2013.01)
*G10L 15/22* (2006.01)

(52) U.S. Cl.
CPC ............. *G06F 40/30* (2020.01); *G06N 3/004* (2013.01); *G10L 15/1815* (2013.01); *G10L 15/22* (2013.01)

(58) Field of Classification Search
CPC .... G06F 40/30; G06F 40/284; G06F 16/3334; G06N 3/004; G10L 15/1815; G10L 15/22; G06K 9/6215; H04L 51/02
See application file for complete search history.

(56) References Cited

U.S. PATENT DOCUMENTS

| | | |
|---|---|---|
| 6,609,122 B1 | 8/2003 | Ensor |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |

(Continued)

OTHER PUBLICATIONS

"Virtual Agent | ServiceNow Docs" webpage (obtained on Mar. 3, 2019 from https://docs.servicenow.com/bundle/london-servicenow-plafform/page/administer/virtual-agent/concept/virtual-agent-overview.html).

*Primary Examiner* — Mohammad K Islam
(74) *Attorney, Agent, or Firm* — Fletcher Yoder PC

(57) ABSTRACT

A computing system may include persistent storage and a software application. The persistent storage may contain (i) pre-defined conversation flows respectively corresponding to conversation topics and (ii) pre-defined mappings that respectively associate the conversation topics to conversational expression(s) with matching semantic meanings. The software application may be configured to: (i) receive, from a computing device and by way of a virtual agent interface, a conversational expression; (ii) based on the pre-defined mappings, determine a particular conversation topic associated with a particular conversational expression, the particular conversational expression having a matching sematic meaning that is within a similarity threshold of a semantic meaning of the received conversational expression; and (iii) in response to determining the particular conversation topic, carry out, by way of the virtual agent interface, a particular conversation flow of the pre-defined conversation flows that corresponds to the particular conversation topic.

13 Claims, 9 Drawing Sheets

(56) References Cited

U.S. PATENT DOCUMENTS

| | | | |
|---|---|---|---|
| 7,689,628 | B2 | 3/2010 | Garg |
| 7,783,744 | B2 | 8/2010 | Garg |
| 7,890,802 | B2 | 2/2011 | Gerber |
| 7,925,981 | B2 | 4/2011 | Pourheidari |
| 7,930,396 | B2 | 4/2011 | Trinon |
| 7,945,860 | B2 | 5/2011 | Vambenepe |
| 7,966,398 | B2 | 6/2011 | Wiles |
| 8,051,164 | B2 | 11/2011 | Peuter |
| 8,224,683 | B2 | 7/2012 | Manos |
| 8,266,096 | B2 | 9/2012 | Navarrete |
| 8,457,928 | B2 | 6/2013 | Dang |
| 8,478,569 | B2 | 7/2013 | Scarpelli |
| 8,674,992 | B2 | 3/2014 | Poston |
| 8,689,241 | B2 | 4/2014 | Naik |
| 8,743,121 | B2 | 6/2014 | De Peuter |
| 8,887,133 | B2 | 11/2014 | Behnia |
| 9,239,857 | B2 | 1/2016 | Trinon |
| 9,535,737 | B2 | 1/2017 | Joy |
| 9,557,969 | B2 | 1/2017 | Sharma |
| 9,792,387 | B2 | 10/2017 | George |
| 9,996,531 | B1 * | 6/2018 | Parastatidis ............ G06F 40/35 |
| 10,219,122 | B1 * | 2/2019 | Scanlon .................. H04W 4/14 |
| 10,679,012 | B1 * | 6/2020 | Salimov ................. G06F 40/35 |
| 10,839,154 | B2 * | 11/2020 | Galitsky ............... G06F 40/205 |
| 2003/0130849 | A1 * | 7/2003 | Durston ................. G10L 15/22 704/270 |
| 2006/0031853 | A1 * | 2/2006 | Kuperstein ......... H04M 3/5166 719/320 |
| 2009/0157408 | A1 * | 6/2009 | Kim ....................... G10L 13/08 704/260 |
| 2015/0294377 | A1 * | 10/2015 | Chow ................ G06Q 30/0282 705/347 |
| 2016/0098386 | A1 * | 4/2016 | Rangarajan Sridhar ..................... G06F 40/58 704/9 |
| 2017/0228367 | A1 * | 8/2017 | Pasupalak ............... G06F 40/40 |
| 2018/0068031 | A1 * | 3/2018 | Hewavitharana ... G06F 16/3329 |
| 2018/0137551 | A1 * | 5/2018 | Zheng ................. G06K 9/00442 |
| 2018/0276273 | A1 * | 9/2018 | Mittal ..................... G06F 40/30 |
| 2018/0375947 | A1 * | 12/2018 | Hodges ............. G06Q 30/0201 |
| 2019/0042988 | A1 * | 2/2019 | Brown ............... G06Q 10/0631 |
| 2019/0102078 | A1 * | 4/2019 | Bhatt .................. G06F 3/04847 |
| 2019/0140986 | A1 * | 5/2019 | Anderson ............ H04L 67/104 |
| 2019/0228107 | A1 * | 7/2019 | Trim ....................... G06F 40/35 |
| 2019/0258967 | A1 * | 8/2019 | Gonzalez .............. G06Q 50/14 |
| 2019/0324527 | A1 * | 10/2019 | Presant ................ G06F 3/0237 |
| 2019/0325081 | A1 * | 10/2019 | Liu ......................... G06F 3/011 |
| 2019/0347363 | A1 * | 11/2019 | Kishimoto ............... G06N 5/04 |
| 2020/0057946 | A1 * | 2/2020 | Singaraju ............... G06N 5/022 |

* cited by examiner

| CONVERSATION TOPIC | CONVERSATIONAL EXPRESSIONS |
|---|---|
| Check IT Ticket Status | "check the status of my incident"<br>"Incident status"<br>"what is the status for [INCIDENT #]"<br>"what's going on with ticket [INCIDENT #]" |
| Open IT Ticket | "open incident"<br>"check the incident"<br>"open a ticket for me with IT"<br>"create an incident" |
| Software Installation | "How can I order this software?"<br>"order software?"<br>"I need [SOFTWARE]"<br>"I want to have [SOFTWARE]" |

FIG. 7

```
┌─────────────────────────────────────────────────────────────────────┐
│ PROVIDE, BY A SOFTWARE APPLICATION AND TO A COMPUTING DEVICE        │
│ ASSOCIATED WITH A MANAGED NETWORK, A VIRTUAL AGENT INTERFACE,       │
│ WHERE PERSISTENT STORAGE IS DISPOSED WITHIN A REMOTE NETWORK        │
│ MANAGEMENT PLATFORM ASSOCIATED WITH THE MANAGED NETWORK, WHERE      │◄── 800
│ THE PERSISTENT STORAGE CONTAINS: (I) A PLURALITY OF PRE-DEFINED     │
│ CONVERSATION FLOWS RESPECTIVELY CORRESPONDING TO CONVERSATION       │
│ TOPICS, WHERE THE PRE-DEFINED CONVERSATION FLOWS RESPECTIVELY       │
│ DEFINE CONVERSATIONAL STATES AND TRANSITIONS THEREBETWEEN, AND (II) │
│ PRE-DEFINED MAPPINGS THAT RESPECTIVELY ASSOCIATE THE CONVERSATION   │
│ TOPICS TO ONE OR MORE CONVERSATIONAL EXPRESSIONS WITH MATCHING      │
│ SEMANTIC MEANINGS                                                   │
└─────────────────────────────────────────────────────────────────────┘
                                   │
                                   ▼
┌─────────────────────────────────────────────────────────────────────┐
│ RECEIVE, BY THE SOFTWARE APPLICATION AND FROM THE COMPUTING DEVICE, │
│ A TEXTUAL OR VERBAL CONVERSATIONAL EXPRESSION, WHERE RECEIVING THE  │◄── 802
│ TEXTUAL OR VERBAL CONVERSATIONAL EXPRESSION OCCURS BY WAY OF THE    │
│ VIRTUAL AGENT INTERFACE                                             │
└─────────────────────────────────────────────────────────────────────┘
                                   │
                                   ▼
┌─────────────────────────────────────────────────────────────────────┐
│ DETERMINE, BY THE SOFTWARE APPLICATION AND BY WAY OF A NATURAL      │
│ LANGUAGE UNDERSTANDING UNIT, A PARTICULAR SEMANTIC MEANING OF THE   │◄── 804
│ TEXTUAL OR VERBAL CONVERSATIONAL EXPRESSION                         │
└─────────────────────────────────────────────────────────────────────┘
                                   │
                                   ▼
┌─────────────────────────────────────────────────────────────────────┐
│ BASED ON THE PRE-DEFINED MAPPINGS, DETERMINE, BY THE SOFTWARE       │
│ APPLICATION, A PARTICULAR CONVERSATION TOPIC ASSOCIATED WITH A      │
│ PARTICULAR CONVERSATIONAL EXPRESSION, THE PARTICULAR CONVERSATIONAL │◄── 806
│ EXPRESSION HAVING A MATCHING SEMATIC MEANING THAT IS WITHIN A       │
│ SIMILARITY THRESHOLD OF THE PARTICULAR SEMANTIC MEANING OF THE      │
│ TEXTUAL OR VERBAL CONVERSATIONAL EXPRESSION                         │
└─────────────────────────────────────────────────────────────────────┘
                                   │
                                   ▼
┌─────────────────────────────────────────────────────────────────────┐
│ IN RESPONSE TO DETERMINING THE PARTICULAR CONVERSATION TOPIC, CARRY │
│ OUT, BY THE SOFTWARE APPLICATION AND BY WAY OF THE VIRTUAL AGENT    │◄── 808
│ INTERFACE, A PARTICULAR CONVERSATION FLOW OF THE PRE-DEFINED        │
│ CONVERSATION FLOWS THAT CORRESPONDS TO THE PARTICULAR               │
│ CONVERSATION TOPIC                                                  │
└─────────────────────────────────────────────────────────────────────┘
```

FIG. 8

PRE-TRAINING OF VIRTUAL CHAT INTERFACES

BACKGROUND

In practice, an enterprise might have tools with which to facilitate management of devices, applications, and/or services on the enterprise's network. For instance, a remote network management platform could provide a web-based application or the like for usage by internal users (e.g., employees of the enterprise) and/or by external users (e.g., customers that engage in transactions with the enterprise). The application could take the form of a virtual agent interface (also known as a chatbot) arranged to carry out conversation(s) with user(s) via auditory and/or textual mechanism(s) on a computing device. Through such conversation(s) via the virtual agent interface, the platform could retrieve information, trigger automation, collect information and open tickets, and resolve issue(s) with and/or provide information about devices, applications, and/or services of the network, among other possibilities. Because a virtual agent interface can assist with management of an enterprise's IT environment, technical improvements to such virtual agent interfaces could provide various benefits to enterprises.

SUMMARY

A remote network management platform could provide a virtual agent interface through which it can effectively engage in numerous conversation topics, so as to assist users in various situations finding information and resolving issues across multiple departments and systems in the enterprise. For example, the virtual agent interface could help facilitate conversations about information technology (IT)-related topics. Through such conversations via the virtual agent interface, the remote network management platform could provide answers to IT-related question(s), create a digital "incident" record for an IT-related issue, provide information about an incident record, trigger software automation for remediation, change a priority level of an incident record, and/or assign an IT-related task to an IT professional, among numerous other options.

Although virtual agent interfaces could have useful features, users might still encounter various challenges when using virtual agent interfaces. For example, a user might seek to carry out a conversation via a virtual agent interface about a particular conversation topic, but the user might first need to engage in a time-consuming back and forth conversational exchange via the virtual agent interface, in an attempt to cause the virtual agent interface to carry out the particular conversation. In some cases, even after the time-consuming back and forth conversational exchange, the virtual agent interface may initiate a conversation about a conversation topic that is different from the particular conversation topic sought-after by the user, thereby resulting in an unsatisfactory user experience. Other examples are also possible.

The present disclosure relates to a software application that is associated with a remote network managed network and that can facilitate improved conversation(s) via a virtual agent interface. According to the present disclosure, the software application could provide the virtual agent interface to a computing device associated with a managed network, could receive a textual or verbal conversational expression by way of the virtual agent interface, and could use a natural language understanding unit as well as pre-defined mappings to quickly and correctly determine a sought-after conversation topic based on the received conversational expression. In this way, the software application can then carry out, by way of the virtual agent interface, a correct conversation flow corresponding to the sought-after conversation topic.

More specifically, the software application could include or have access to the natural language understanding unit, and could also have access to pre-defined conversation flows and mappings, which may be stored on persistent storage disposed within the remote network managed network. The natural language understanding unit could enable the software application to determine a semantic meaning of a conversational expression, such as by converting the conversational expression to a machine-understandable representation of its meaning. Additionally, the pre-defined conversation flows may respectively correspond to conversation topics, and may each respectively define conversational states and transitions therebetween. Further, the pre-defined mappings may respectively associate the conversation topics to conversational expression(s) with matching semantic meanings.

Given this, the software application could leverage the natural language understanding unit and the pre-defined mappings to correctly determine a conversation topic sought-after by a user. In this process, the software application could determine a particular semantic meaning of the received conversational expression by way of the natural understanding unit. Then, the software application could identify a particular conversational expression, from among those included in the pre-defined mappings, based on the particular conversational expression having a sematic meaning that is within a similarity threshold of the particular semantic meaning of the received conversational expression. In turn, the software application could use the pre-defined mappings as basis to determine a particular conversation topic associated with the particular conversational expression, and could then responsively carry out, by way of the virtual agent interface, a particular conversation flow of the pre-defined conversation flows that corresponds to the particular conversation topic.

Accordingly, a first example embodiment may involve a computing system including persistent storage disposed within a remote network management platform associated with a managed network as well as a software application associated with the remote network management platform. The persistent storage may contain: (i) a plurality of pre-defined conversation flows respectively corresponding to conversation topics, where the pre-defined conversation flows respectively define conversational states and transitions therebetween, and (ii) pre-defined mappings that respectively associate the conversation topics to one or more conversational expressions with matching semantic meanings. And the software application may have access to the pre-defined conversation flows and to the pre-defined mappings.

Further, the software application may be configured to: provide, to a computing device associated with the managed network, a virtual agent interface; receive, from the computing device and by way of the virtual agent interface, a textual or verbal conversational expression; determine, by way of a natural language understanding unit, a particular semantic meaning of the textual or verbal conversational expression; based on the pre-defined mappings, determine a particular conversation topic associated with a particular conversational expression, the particular conversational expression having a matching sematic meaning that is within a similarity threshold of the particular semantic meaning of the textual or verbal conversational expression; and in response to determining the particular conversation topic, carry out, by way of the virtual agent interface, a particular conversation flow of the pre-defined conversation flows that corresponds to the particular conversation topic.

A second example embodiment may involve providing, by a software application and to a computing device associated with a managed network, a virtual agent interface, where persistent storage is disposed within a remote network management platform associated with the managed network, where the persistent storage contains: (i) a plurality of pre-defined conversation flows respectively corresponding to conversation topics, where the pre-defined conversation flows respectively define conversational states and transitions therebetween, and (ii) pre-defined mappings that respectively associate the conversation topics to one or more conversational expressions with matching semantic meanings.

The second example embodiment may also involve receiving, by the software application and from the computing device, a textual or verbal conversational expression, where receiving the textual or verbal conversational expression occurs by way of the virtual agent interface. The second example embodiment may additionally involve determining, by the software application and by way of a natural language understanding unit, a particular semantic meaning of the textual or verbal conversational expression. The second example embodiment may further involve, based on the pre-defined mappings, determining, by the software application, a particular conversation topic associated with a particular conversational expression, the particular conversational expression having a matching sematic meaning that is within a similarity threshold of the particular semantic meaning of the textual or verbal conversational expression. The second example embodiment may yet further involve, in response to determining the particular conversation topic, carrying out, by the software application and by way of the virtual agent interface, a particular conversation flow of the pre-defined conversation flows that corresponds to the particular conversation topic.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts example mappings, in accordance with example embodiments.

FIG. 8 is another flow chart, in accordance with example embodiments.

DETAILED DESCRIPTION

Figure 1:
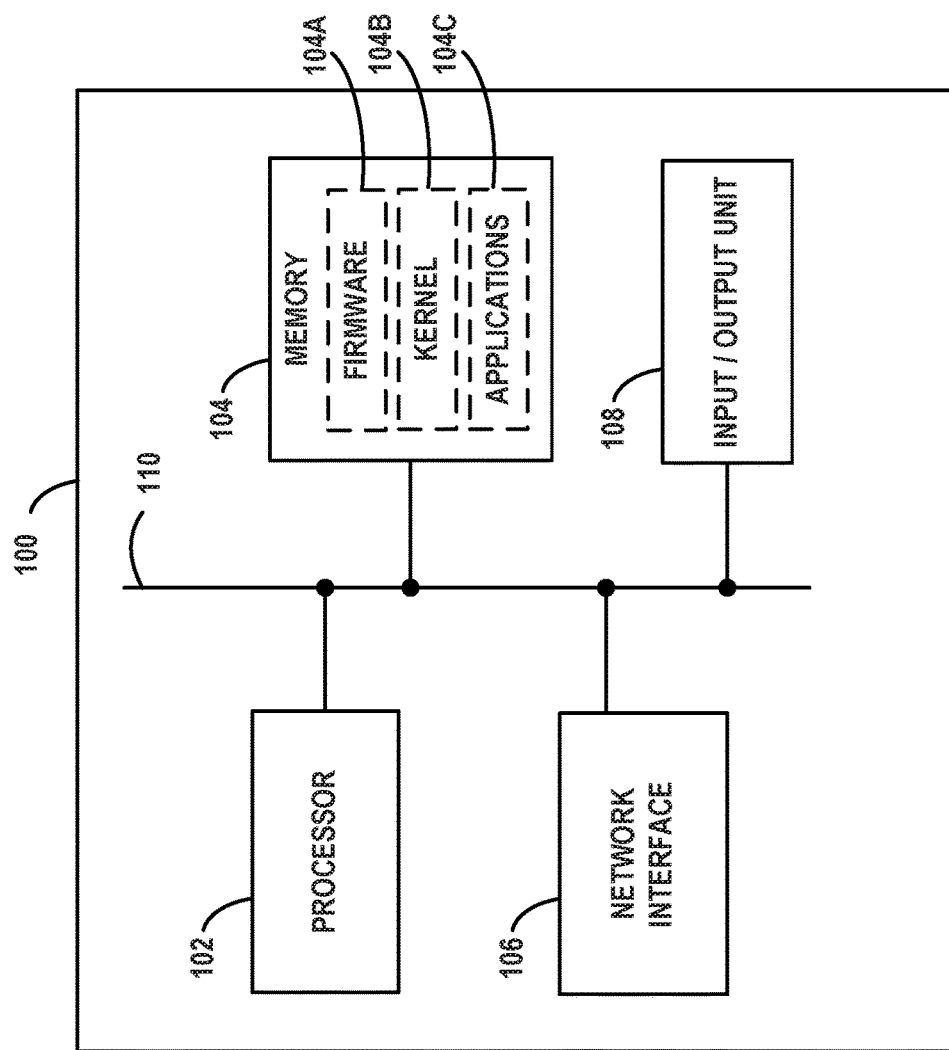
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
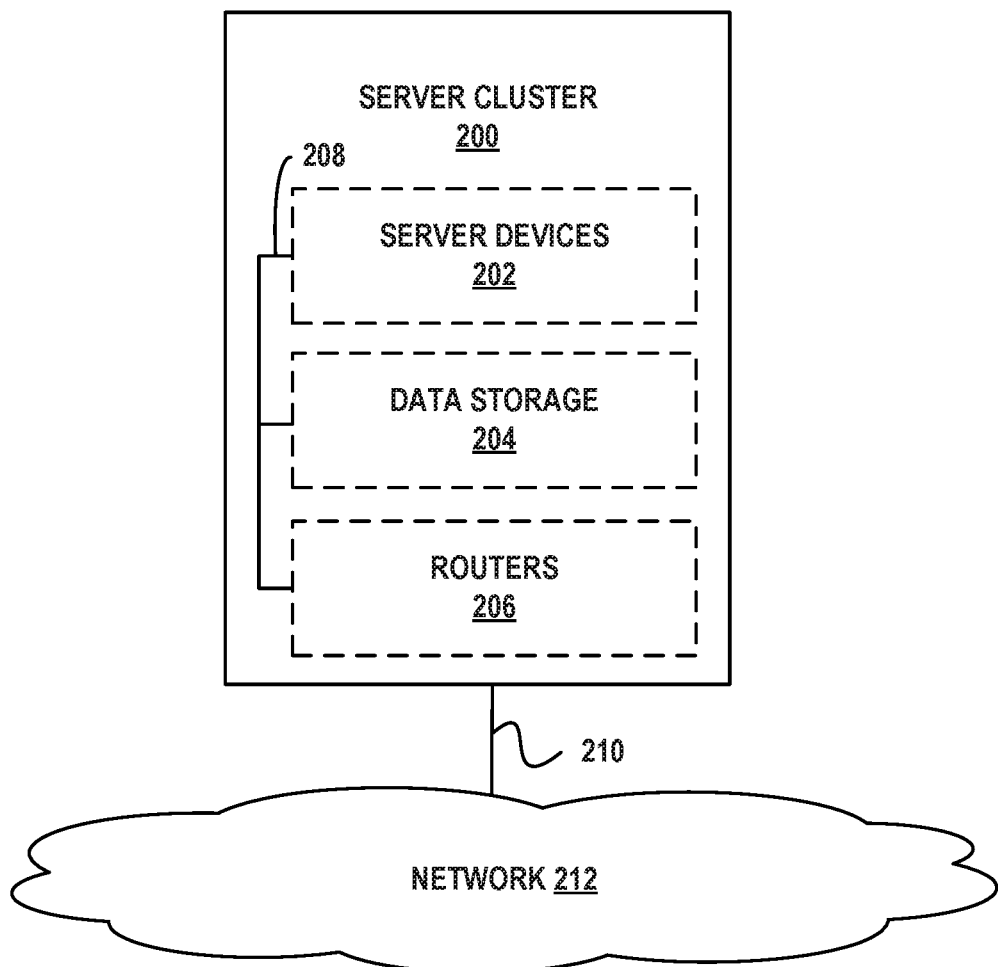
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
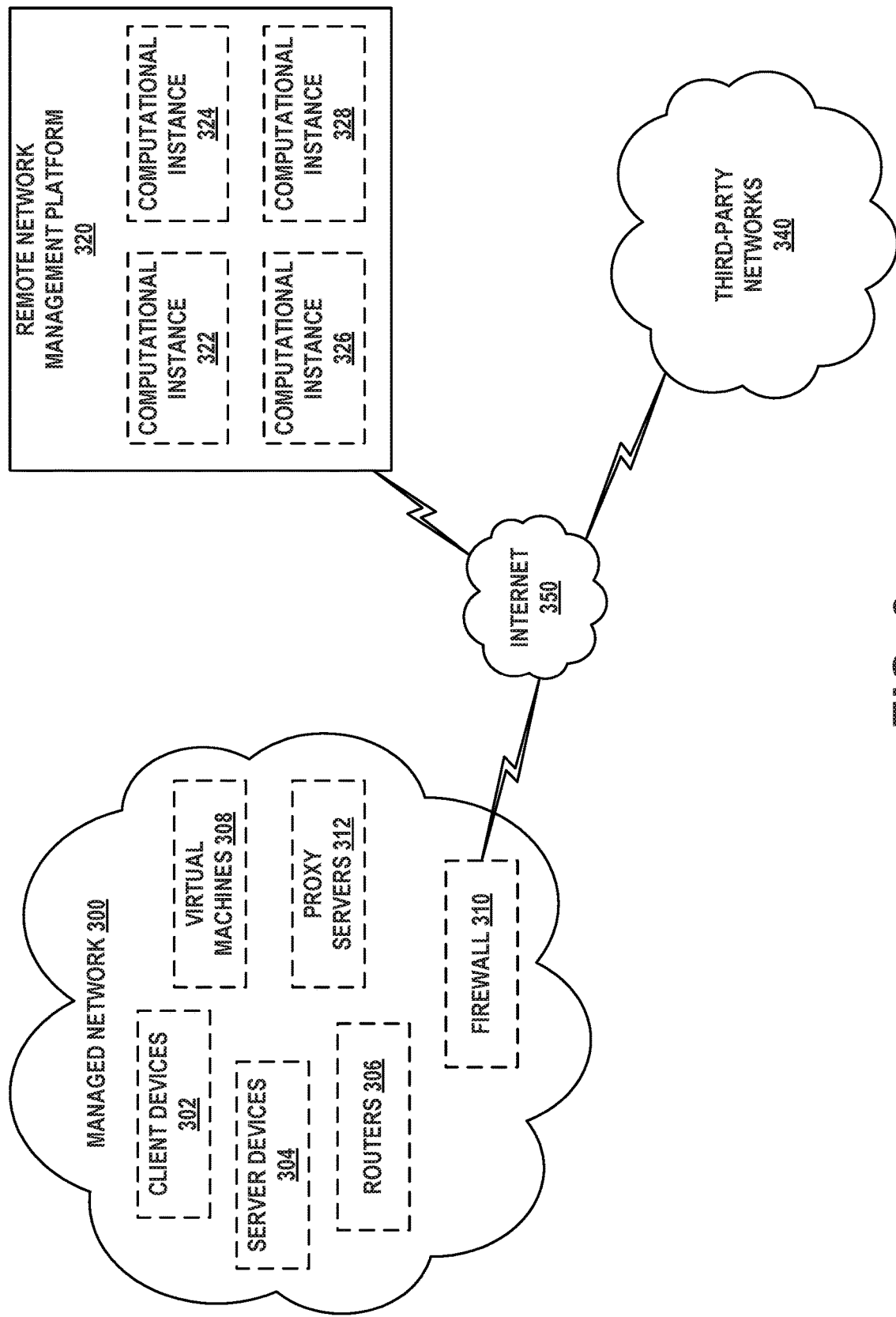
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
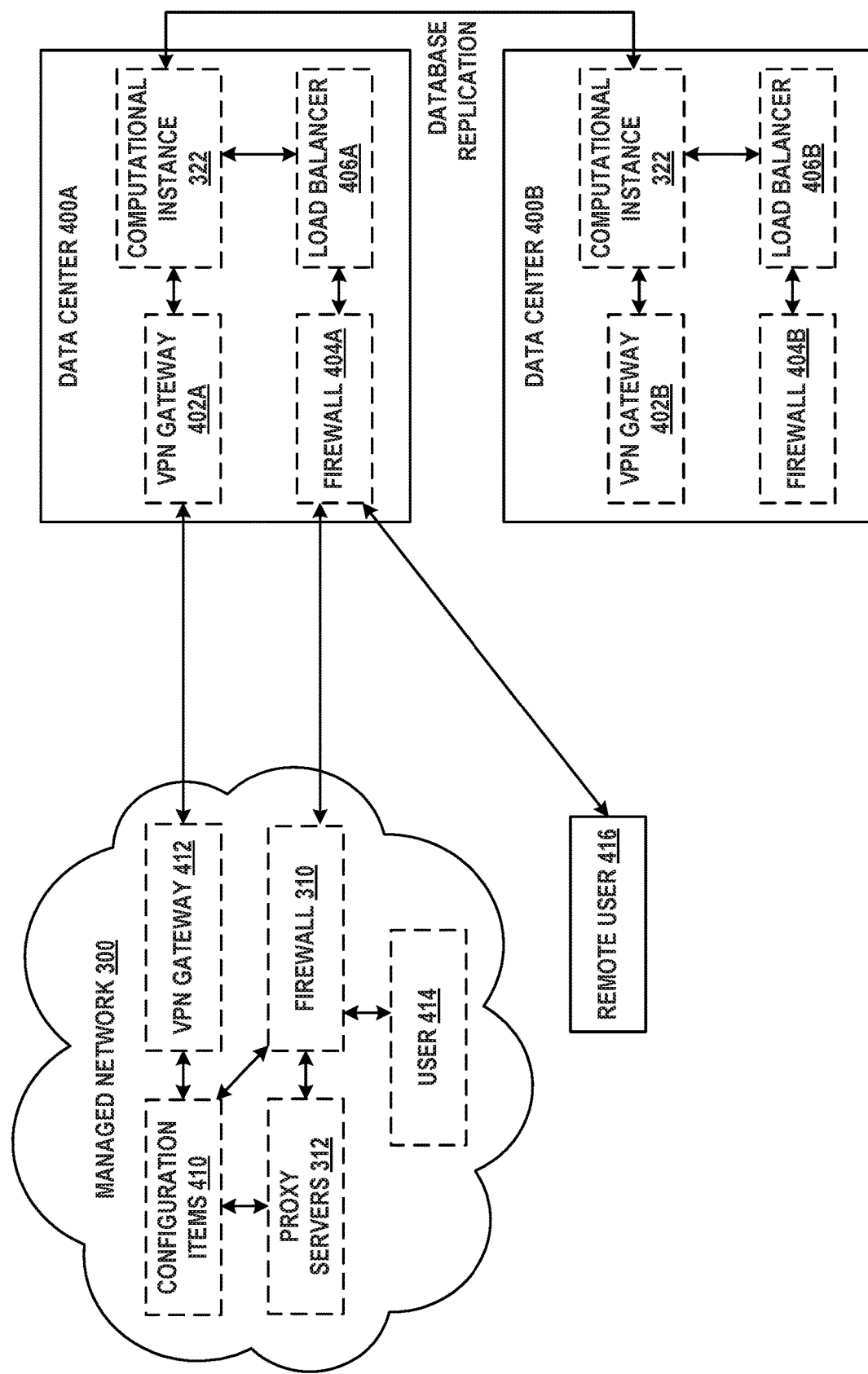
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
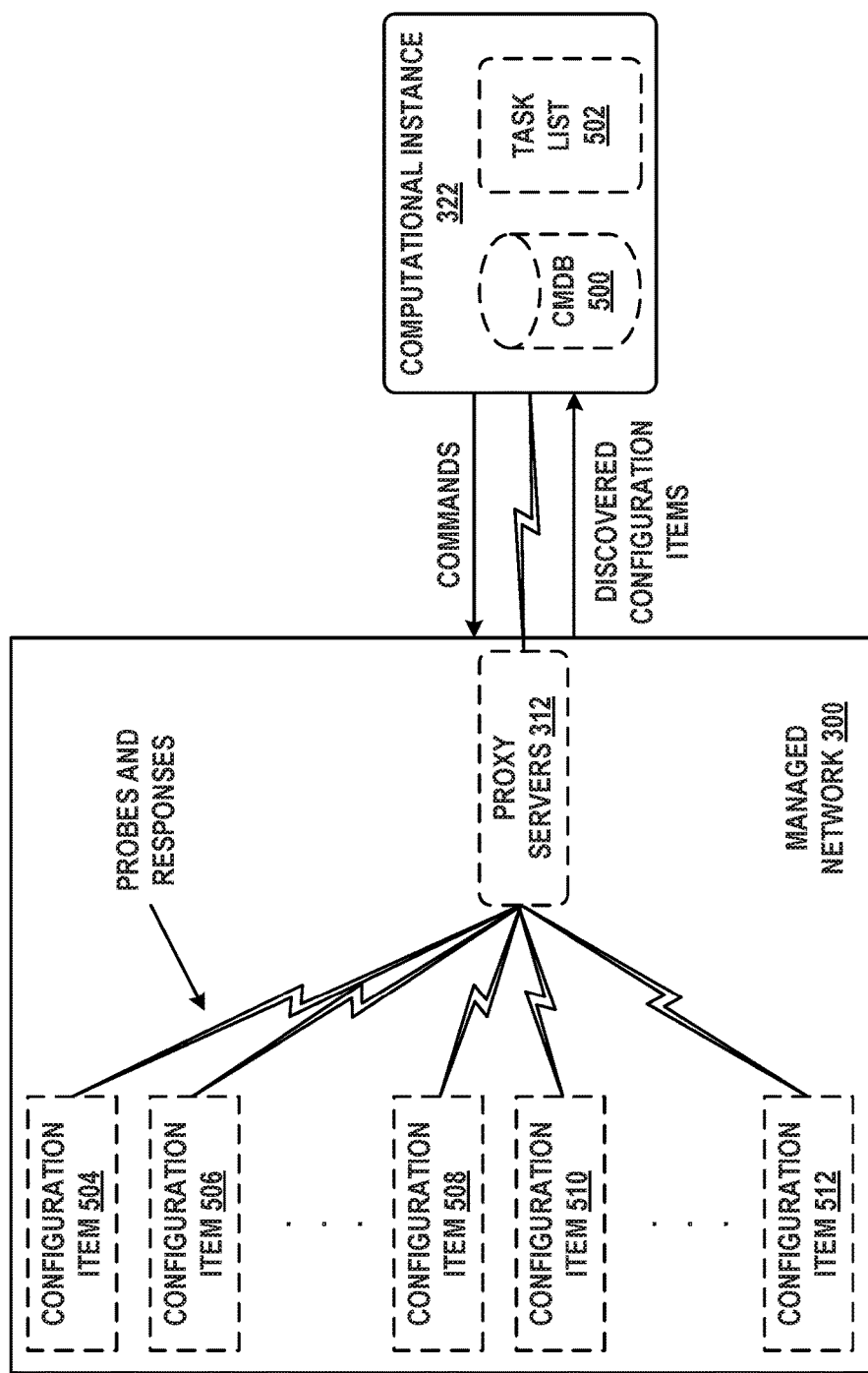
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
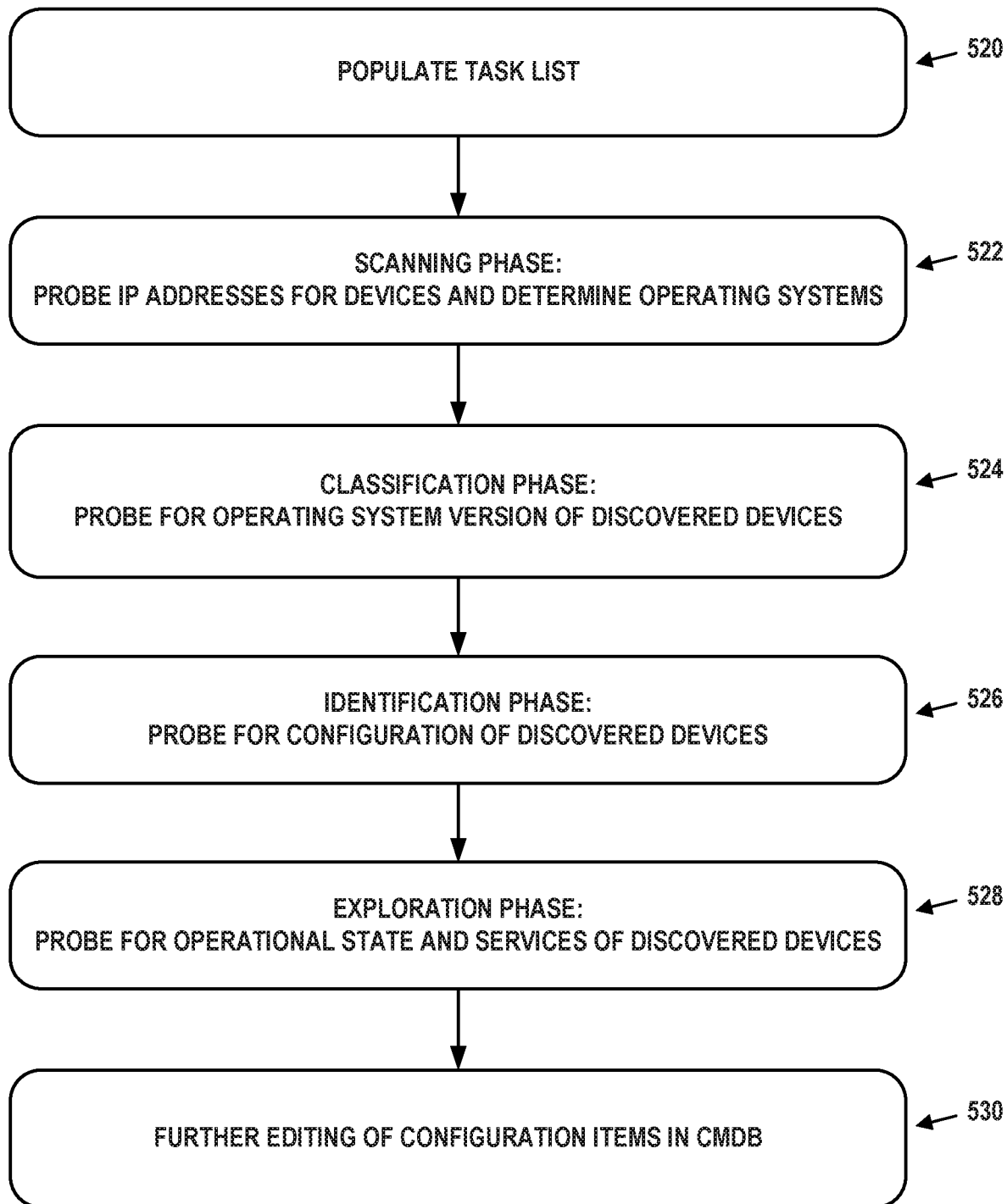
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Software-Assisted Improved Conversations Via a Virtual Agent Interface

Disclosed herein is a software application that can help facilitate improved conversations via a virtual agent interface (e.g., a chatbot). The software application could leverage a natural language understanding unit and pre-defined respective mappings between conversation topics and conversational expression(s), so as to correctly determine a conversation topic based on conversational expression(s) received from a user via the virtual agent interface. Once the correct conversation topic is determined by the software application, the software application could then responsively carry out, by way of the virtual agent interface, a conversation flow corresponding to this conversation topic, so as to meet the user's needs.

Overall, the disclosed software application could provide numerous benefits to user(s) associated with an enterprise. For example, the software application is likely to correctly initiate, by way of the virtual agent interface, a conversation about a topic sought-after by a user rather than about a different topic, which may improve the user's experience. Also, the software application might do so without the user needing to spend excessive time engaging in a back and forth conversational exchange via the virtual agent interface just to initiate the sought-after conversation, thereby quickly and efficiently meeting the user's needs. Other technical improvements and advantages are also contemplated herein.

Figure 6:
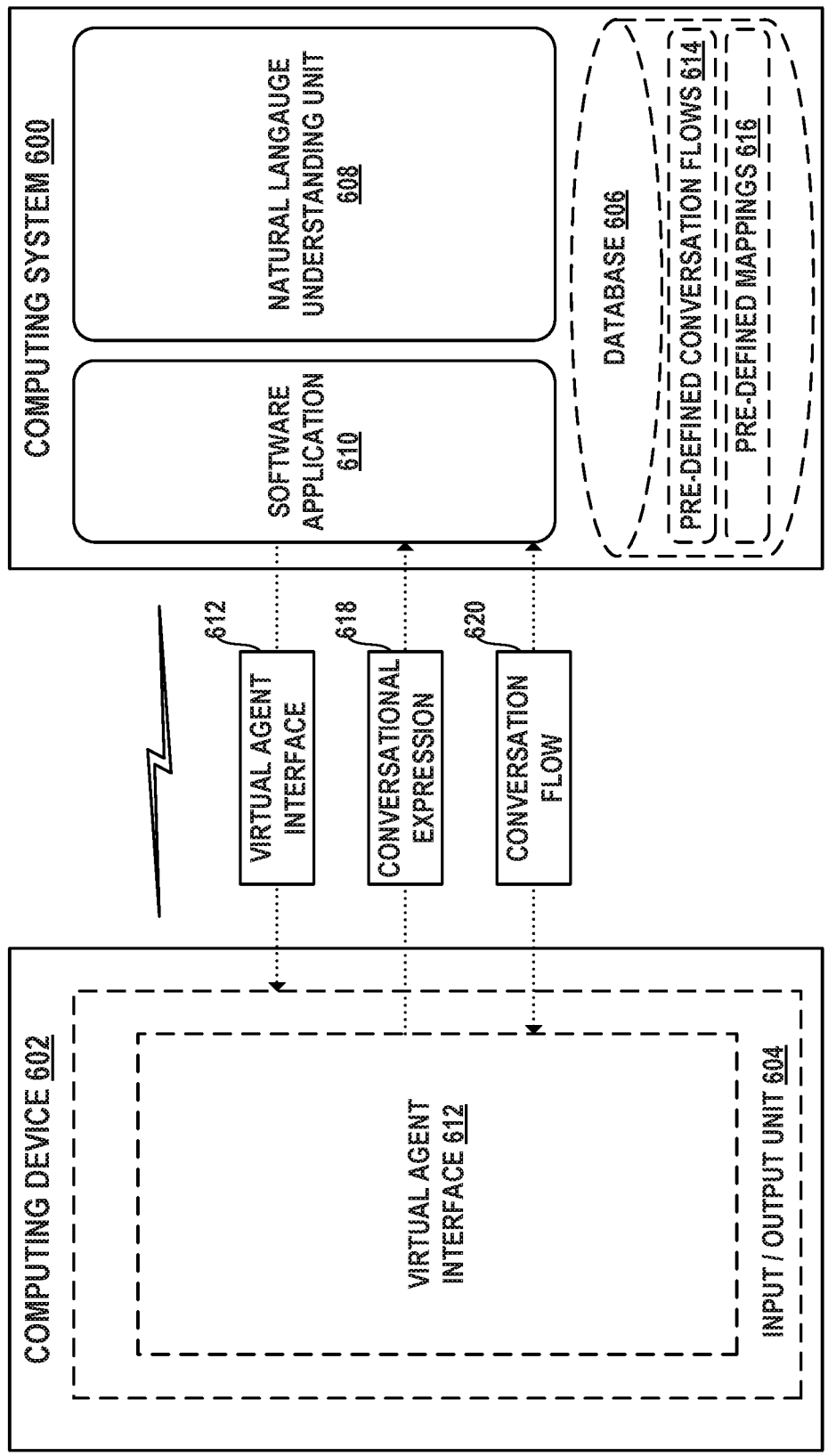
FIG. 6 depicts communications between a computing system and a computing device, in accordance with example embodiments.

FIG. 6 illustrates features, components, and/or operations of a computing system 600 and of a computing device 602. Although FIG. 6 illustrates a specific arrangement, operations disclosed herein may be carried out in the context of similar and/or other arrangement(s) as well without departing from the scope of the present disclosure.

Computing device 602 may include feature(s) and/or components of computing device 100, and could be one of the client devices 302 of the managed network 300, for example. Generally, the computing device 602 could engage in communication(s) with computing system 600, such as via wired and/or wireless communication link(s). Moreover, as shown, the computing device 602 may include an input/output unit 604, which could be the same as or similar to the input/output unit 108 described herein.

Specifically, input/output unit 604 may facilitate interaction with computing device 602. Input/output unit 604 may include input and/or output device(s) that enable verbal/audible communication by way of the computing device 602. For example, input/output unit 604 may include microphone(s) to enable a user to provide a verbal conversational expression by way of the computing device 602 and/or may include speaker(s) configured to output audible information to the user. Additionally or alternatively, input/output unit 604 may include input and/or output device(s) that enable textual/visual communication by way of the computing device 602. For example, input/output unit 604 may include a display device configured to output textual/visual information to the user. Also, input/output unit 604 may include a keyboard, a mouse, and/or a touch screen to enable a user to provide a textual conversational expression by way of computing device 602. Other examples are also possible.

Further, the computing device 602 may be configured to operate a web browser (not shown), which is an application that may retrieve, present, and/or navigate through information on the World Wide Web and/or on private websites. Given the input/output unit 604, the computing device 602 could enable a user to engage in various types of communication via the web browser. For example, a user could provide textual and/or verbal conversational expression(s) to a web-based application executing via the web browser on the computing device 602, and the web-based application could visually and/or audibly present information to the user via the web browser on computing device 602. Other examples are also possible.

The computing system 600 could include features and/or components of a managed network and/or of a remote network management platform that supports remote management of the managed network.

In particular, the computing system 600 may include a database 606. This database 606 could be a CMDB of a computational instance, such as CMDB 500 for example. Additionally or alternatively, database 606 may be a database that is different from a CMDB. In any case, a database could take the form of or could otherwise be referred to herein as persistent storage, among other possibilities.

Also, computing system 600 may include server device(s) (not shown). The server device(s) may contain or may otherwise have access to program instructions executable by processor(s), so as to cause the computing system 600 to carry out various operations described herein. On this point, the server device(s) may include server device(s) disposed within a computational instance of a remote network management platform, such as within computational instance 322. Additionally or alternatively, the server device(s) may include server device(s) disposed within the managed network 300 (e.g., proxy server 312). In any case, a natural language understanding unit 608 and a software application 610 could be deployed on such server device(s), so as to help facilitate aspects of the present disclosure.

Generally, the natural language understanding unit 608 may be any currently known and/or future-developed computer application or the like that could determine or otherwise understand structure and/or meaning of human language. The natural language understanding unit 608 may be configured to apply any currently-known and/or future-developed semantic parsing techniques to determine a semantic meaning of a conversational expression, such as by converting the conversational expression to a machine-understandable representation of its meaning. Thus, the software application 610 could determine, by way of the natural language understanding unit 608, a semantic meaning of a conversational expression provided by a user, so as to effectively understand the user's intent in the conversational expression.

As shown by FIG. 6, the software application 610 could also be configured to provide a virtual agent interface 612 to the computing device 602. The virtual agent interface 612, which could also be referred to as a chatbot or the like, could be a computer program configured to carry out conversation(s) with user(s). The virtual agent interface 612 could take the form of or otherwise be incorporated as part of a messaging, e-mail, and/or other web-based application associated with the remote network management platform 320 and/or associated with third-party platform(s). Moreover, the software application 610 could provide the virtual agent interface 612 to the computing device 602 in various ways.

In one example, the software application 610 could provide graphical user interface representation(s) of the virtual agent interface 612 to the computing device 602. In doing so, the software application 610 could cause the computing device 602 to textually/visually display information via the graphical user interface representation(s) of the virtual agent interface 612 (e.g., textual statement(s), command(s) and/or prompt(s)). The provided graphical user interface representation(s) could also enable a user to enter textual conversational expression(s), so that the software application 610 could receive such textual conversational expression(s) from the computing device 602 via the virtual agent interface 612. For instance, a user could provide a textual conversational expression via a field in a graphical user interface representation of the virtual agent interface 612, and the software application 610 could in turn receive, from the computing device 602, a text file or another form of text input representing the textual conversational expression.

In another example, the software application 610 could provide, to the computing device 602, verbal/audible communication instructions associated with the virtual agent interface 612. Those instructions could cause the computing device 602 to output certain audible information (e.g., audible statement(s), command(s) and/or prompt(s)) to a user. Additionally or alternatively, those instructions could cause the computing device 602 to transmit, to the software application 610, verbal conversational expression(s) provided by a user. In some cases, the computing device 602 could transmit, to the software application 610, an audio file including a waveform representation of the verbal conversational expression(s), and the software application 610 could apply currently-known and/or future-developed speech recognition technique(s) to generate a textual representation of the verbal conversational expression(s) included in the waveform representation. In other cases, the computing device 602 could apply the speech recognition technique(s) and could transmit, to the software application 610, a text file including the textual representation. Other examples are also possible.

Further, the software application 610 could have access to pre-defined conversation flows 614. The database 606 may contain such conversation flows 614 in any feasible format (e.g., XML or entries within a table). Also, the conversation flows 614 may be associated with the virtual agent interface 612, and thus the software application 610 could respectively carry out any one of the conversation flows 614 by way of the virtual agent interface 612.

Generally, each of the conversation flows 614 may respectively define conversational states and transitions therebetween. A given conversational state may be one at which the software application 610 causes the virtual agent interface 612 to provide information to a user, prompts the user to provide information, or receives information from the user (e.g., in a conversational expression) etc. Also, a given conversation flow may include a transition from a particular conversational state to another conversation without there being any other possible transitions from that particular conversational state. Additionally or alternatively, a given conversation flow may include respective transitions from a particular conversational state to other conversational states. And the software application 610 could carry out one of those transitions from the particular conversational state based on various factor(s), such as based on information received from the user by way of the virtual agent interface 612, for example. Moreover, a given conversation flow, of the conversation flows 614, could respectively define an initial conversational state at which the given conversation flow is arranged to initiate by default.

On this point, each of the conversation flows 614 may respectively correspond to a conversation topic, and the database 606 may have stored thereon data indicating which conversation flow corresponds to which conversation topic. By way of example, a given conversation topic may be about a particular IT-related issue, and thus this conversation topic may correspond to a conversation flow defining conversational states and transitions therebetween related to actions for remediating the particular IT-related issue. In more specific examples, conversation topics and their corresponding conversation flows 614 may respectively involve: providing of answer(s) to IT-related question(s), creation of an incident record for an IT-related issue, providing of information about an incident record, changing of a priority level of an incident record, and/or assignment of an IT-related task to an IT professional, among other options. Other examples not related to IT are also possible.

According to the present disclosure, the software application 610 could also have access to pre-defined mappings 616. Here again, the database 606 may contain such mappings 616 in any feasible format (e.g., XML or entries within a table). Also, the mappings 616 may be associated with the virtual agent interface 612, so that the software application 610 could use the mappings 616 as basis for determining a conversation topic and in turn a corresponding conversation flow to carry out by way of the virtual agent interface 612, in line with the present disclosure.

The mappings 616 may respectively associate each conversation topic (i.e., from among the conversation topics corresponding to conversation flows 614) to conversational expression(s) with matching semantic meanings. For example, a user's "intention" could be to engage in a particular conversation topic via the virtual agent interface 612, and the user could provide one of various conversational expressions to describe that intention. Namely, those various conversational expressions may have a matching sematic meaning representing the intention at issue. As such, one of the mappings 616 could associate that particular conversation topic to those various conversational expressions and/or to a machine-understandable representation of their matching semantic meaning. And another one the mappings 616 could associate a different conversation topic to different conversational expression(s) and/or to a machine-understandable representation of their matching semantic meaning, and so on.

FIG. 7 next illustrates example mappings 700 that respectively associate conversation topics to conversational expression(s) with matching semantic meanings, in accordance with the present disclosure.

As an example in line with FIG. 7, a user's intention could be to engage in a "check IT ticket status" conversation topic via virtual agent interface 612 so as to obtain information about a status of an incident record for an IT-related issue. The user could provide any one of the following conversational expressions to describe that intention: "check the status of my incident", "Incident status", "what is the status for [INCIDENT #]" where [INCIDENT #] is an identifier of the incident record, and "what's going on with ticket [INCIDENT #]", among numerous other possibilities. As such, mapping 702 of mappings 702 could associate the "check IT ticket status" conversation topic to those conversational expressions and/or to a machine-understandable representation of their matching semantic meaning.

In another example, a user's intention could be to engage in an "open IT ticket" conversation topic via virtual agent interface 612 so as to create an incident record for an IT-related issue. The user could provide any one of the following conversational expressions to describe that intention: "open incident", "check the incident", "open a ticket for me with IT", and "create an incident", among numerous other possibilities. As such, mapping 704 of mappings 700 could associate the "open IT ticket" conversation topic to those conversational expressions and/or to a machine-understandable representation of their matching semantic meaning.

In yet another example, a user's intention could be to engage in a "software installation" conversation topic via virtual agent interface 612 so as to request that particular software be installed on the user's device. The user could provide any one of the following conversational expressions to describe that intention: "how can I order this software?", "order software?", "I need [SOFTWARE]" where [SOFTWARE] is an identifier of the particular software, and "I want to have [SOFTWARE]", among numerous other possibilities. As such, mapping 706 of mappings 700 could associate the "software installation" conversation topic to those conversational expressions and/or to a machine-understandable representation of their matching semantic meaning. Other examples are also possible.

Generally, there may be a certain set of conversation topics that cover the vast majority of conversations sought-after by users associated with an enterprise, and thus the mappings 616 may include those conversation topics to meet the users' needs. For example, there may be thirty IT-related conversation topics that cover the vast majority of IT-related issues and/or requests at an enterprise. Consequently, the mappings 616 could include at least one mapping respectively for each of those thirty IT-related conversation topics, and the software application 610 could leverage those mappings 616 to meet many of the users' IT-related needs. Other examples and advantages are also possible.

In a system arranged as described, the software application 610 could leverage the natural language understanding unit 608 and the pre-defined mappings 616, so as to correctly determine a conversation topic and then responsively carry out, by way of the virtual agent interface 612, a conversation flow corresponding to this conversation topic. In particular, after the software application 610 receives a conversational expression 618 by way of the virtual agent interface 612, the software application 610 could (i) determine a particular semantic meaning of the conversational expression 618 by way of the natural language understanding unit 608 as described, (ii) determine a particular conversational expression having a matching sematic meaning that is within a similarity threshold of the particular semantic meaning of the conversational expression 618, (iii) use the pre-defined mappings 616 as basis to determine a particular conversation topic associated with the particular conversational expression, and (iv) then responsively carry out, by way of the virtual agent interface 612, a particular conversation flow 620, of the conversation flows 614, that corresponds to the particular conversation topic.

In this topic-determination process, the conversational expression 618 provided by the user could be one of those included in the mappings 616, and thus the software application 610 could use the mappings 616 to determine a conversation topic associated with the conversational expression 618. However, the user does not necessarily need to provide one of the conversational expressions included in the mappings 616 in order for the software application 610 to ascertain the user's intended conversation topic and in turn carry out a corresponding conversation flow. Namely, even if the conversational expression 618 includes misspelling(s), abbreviation(s), synonym(s), and/or alternative sentence structure(s) relative to those used in any of the conversational expressions of the mappings 616, the software application 610 could leverage the particular semantic meaning of the conversational expression 618 so as to determine a particular conversational expression in the mappings 616 that reasonably matches the conversational expression 618 and, in turn, determine the intended conversation topic associated with the particular conversational expression in accordance with the mappings 616.

More specifically, the software application 610 may analyze the particular semantic meaning of the conversational expression 618 so as to effectively determine a user's intention to engage in the particular conversation topic. In doing so, the software application 610 may compare the particular semantic meaning of the conversational expression 618 respectively to semantic meanings of conversational expressions included in the mappings 616, so as to effectively determine which of those conversational expressions has a semantic meaning that reasonably matches the particular semantic meaning of the conversational expression 618. Through such comparison, the software application 610 could determine that a particular conversational expression has a semantic meaning that is within a similarity threshold of the particular semantic meaning, thereby indicating that the particular conversational expression reasonably matches the conversational expression 618 with respect to its intent.

Generally, the software application 610 could determine in various ways that a given conversational expression has a semantic meaning that is within a similarity threshold of the particular semantic meaning of the conversational expression 618.

By way of example (and without limitation), the software application 610 could apply, via the natural language understanding unit 608, any currently-known and/or future-developed techniques to determine a confidence score indicating a probability that the particular semantic meaning of the conversational expression 618 is the semantic meaning of the given conversational expression. If the software application 610 then determines that the confidence score is at or above a threshold confidence score, then the software application 610 could deem the given conversational expression as having a semantic meaning that is within the similarity threshold of the particular semantic meaning. On the other hand, if the software application 610 determines that the confidence score is below the threshold confidence score, then the software application 610 could deem the given conversational expression as having a semantic meaning that is not within the similarity threshold at issue.

In a more specific example, the software application 610 could apply word embedding, so as to determine whether conversational expressions are within a similarity threshold of one another with respect to their semantic meanings. Word embedding relates to techniques in natural language processing where words, phrases, sentences, and/or paragraphs, or the like are mapped to vectors in a vector space. Examples of word embedding software tools include, but are not limited to, Word2vec and GloVe.

In particular, word vectors are vectors that individually correspond to respective words in a corpus of words (e.g., the set of words present in a particular literary work, or a set of literary works) and that are embedded in a semantically-encoded multidimensional vector space. Words with similar meanings or other semantic content or associations (e.g., "strong" and "forceful," or "slick" and "slippery") have corresponding word vectors that are located near each other in the vector space. On the other hand, words with unrelated meanings or other semantic content or associations (e.g., "France" and "cone," or "gerbil" and "hypotenuse") have corresponding word vectors that are located farther apart within the semantically encoded vector space than pairs of words that are more similar to each other. An encoder can produce a plurality of word vectors corresponding to respective different words that are present in text of interest.

These word vectors can then be used to determine whether strings of text are similar to each other or to perform some other classification or processing related to the strings of text (e.g., combining the word vectors associated with the words present in the strings of text and determining whether the combinations are similar). The word vectors being of the same size permits words of varying size, and text strings of varying size and/or number of words, to be compared more easily and/or to be applied to the input of a classifier (e.g., an artificial neural network (ANN)). The concept of word vectors can be extended into paragraph vectors, which represent, in the same semantic space as the word vectors, the context and/or overall semantic content of phrases, sentences, paragraphs, or other multi-word samples of text.

Word vectors and/or paragraph vectors can be a useful way to represent the semantic content of samples of text. Word vectors and paragraph vectors permit certain semantic operations to be performed on the text (e.g., analogy by vector arithmetic, semantic aggregation), words or other strings of differing length to be applied to fixed-length inputs of an algorithm or process (e.g., ANNs or other classifiers for sentiment detection or other classification), low-cost comparison of the semantic content of different samples of text, or other beneficial applications.

Given this, word and/or paragraph vectors could be determined based on conversational expressions in mappings 616, conversational expressions provided by user(s) via the virtual agent interface 612, text in incident records associated with a managed network, and/or text in other documents and/or file accessible by the software application 610, among other options. The software application 610 could then use those word vectors and/or paragraph vectors to determine similarity between conversational expressions or the like.

For instance, the software application 610 could apply currently-known and/or future-developed techniques (e.g., cosine similarity) to determine a measure of similarity between word and/or paragraph vectors that correspond to conversational expressions. If the software application 610 determines that the measure of similarity is at or above a threshold measure, then the software application 610 could deem that those conversational expressions are within a similarity threshold of one another with respect to their semantic meanings. Whereas, if the software application 610 determines that the measure of similarity below the threshold measure, then the software application 610 could deem that those conversational expressions are not within the similarity threshold at issue. Other examples are also possible.

Accordingly, once the software application 610 determines a particular conversational expression that reasonably matches the conversational expression 618 with respect to its intent, the software application 610 could use the mappings 616 as basis to determine a particular conversation topic associated with the particular conversational expression, and could then responsively carry out, by way of the virtual agent interface 612, a particular conversation flow 620 that corresponds to the particular conversation topic.

By way of example (and without limitation), a user could provide a conversational expression "please provide the status of my incident", and the software application 610 could determine that the above-mentioned conversational expression "check the status of my incident" reasonably matches this conversational expression in its intent. Then, the software application 610 could use the mappings 616 as basis to determine that the above-mentioned "check IT ticket status" conversation topic is associated with the conversational expression "check the status of my incident". And the software application 610 could then responsively carry out, by way of the virtual agent interface 612, the conversation flow that corresponds to the "check IT ticket status" conversation topic, which is the conversation topic intended by the user. Other examples are also possible.

In some situations, the software application 610 might determine multiple possible conversation topics using the topic-determination process and may prompt a user to select one of those conversation topics. For example, the software application 610 could determine first and second conversational expressions each respectively having a sematic meaning that is within a similarity threshold of the semantic meaning of the conversational expression 618. Based on the mappings 616, the software application 610 could then determine a first conversation topic associated with the first conversational expression as well as a second conversation topic associated with the second conversational expression, the first and second conversation topics being different from one another. So in response to determining both the first and the second conversation topics, the software application 610 could provide, by way of the virtual agent interface 612, an option to select one of those conversation topics. In turn, the software application 610 could receive, by way of the virtual agent interface 612, an indication that the first conversation topic is selected and may responsively carry out a conversation flow corresponding to the first conversation topic. Other examples are also possible.

In other situations, the software application 610 might determine just one conversation topic according to the topic-determination process and thus may automatically initiate the conversation flow corresponding to this conversation topic without further prompting the user. For example, the software application 610 could determine that a particular conversational expression is the only conversational expression, from among those included in the mappings 616, with a sematic meaning that is within a similarity threshold of the semantic meaning of the conversational expression 618. Based on this particular conversational expression being the only conversational expression with a sematic meaning that is within the similarity threshold, the software application 610 could responsively carry out a conversation flow corresponding to a conversation topic that is associated with this particular conversational expression according to the mappings 616. Other examples are also possible.

In an example implementation, the software application 610 could execute the topic-determination process at various times. In some cases, the software application 610 could execute the topic-determination process to determine a conversation topic/flow when the software application 610 is not carrying out any other conversation flow. In other cases, however, the software application 610 could execute the topic-determination process to determine a conversation topic/flow while the software application 610 is carrying out a different conversation flow of the conversation flows 614, so as to facilitate mid-topic switching of a conversation flow. For example, while carrying out the different conversation flow, the software application 610 could (i) receive the conversational expression 618, (ii) determine the particular semantic meaning of the conversational expression 618, (iii) determine a particular conversational expression having a semantic meaning that is within a similarity threshold of the particular semantic meaning of the conversational expression 618, (iv) determine a particular conversation topic as described, and (v) responsively switch from carrying out the different conversation flow to carrying out a particular conversation flow that corresponds to the particular conversation topic. Other examples are also possible.

In a further aspect, the software application 610 may also be configured to facilitate an attribute-extraction process in which the software application 610 (i) determines a particular attribute that corresponds to at least a portion of a conversational expression and (ii) carries out a particular conversation flow in accordance with the particular attribute. This conversational expression may be one that the software application 610 receives before carrying out the particular conversation flow (e.g., a conversational expression provided with the intent to engage in a conversation topic corresponding to the particular conversation flow). Alternatively, this conversational expression may be one that the software application 610 receives during the particular conversation flow, such as during a particular conversational state defined by the particular conversation flow. In any case, the software application 610 could use the particular attribute as basis to carry out action(s) that advantageously enhance a user's experience and/or save the user time and effort when interacting with virtual agent interface 612.

More specifically, the software application 610 could determine various attribute(s) during the attribute-extraction process. For example, the software application 610 could determine that at least a portion of a conversational expression correspond to a particular time, a particular date, a particular location, a particular entity (e.g., a user or enterprise), a particular configuration item, and/or an attribute associated with a particular incident record, among other possibilities. The attribute associated with a particular incident record could be a unique identifier of the particular record, a priority level of the particular record, a state of the particular record, a description of the particular record, or a category of the particular record, among other possibilities. Numerous other examples are also possible.

Further, the software application 610 could determine in various ways that a particular attribute corresponds to at least a particular portion of a conversational expression.

In one example implementation, the software application 610 could determine that the particular portion matches the particular attribute. Specifically, the software application 610 could have access to attributes stored in database 606. In line with the discussion above, those attributes may include pre-defined attributes associated with the remote network management, such as time(s), date(s), and/or pre-defined priority levels established for use in incident records, among others. Additionally or alternatively, those attributes may include attributes associated with an enterprise's managed network, such as a location of the enterprise, identifier(s) of user(s) of the managed network, attribute(s) of configuration item(s) of the managed network, and/or attribute(s) of incident record(s) associated with the managed network, among others. In any case, the software application 610 could apply any currently-known and/or future-developed keyword matching techniques to determine that the particular portion textually matches at least one of the attributes accessible by the software application 610.

In another example implementation, the software application 610 could determine that the particular portion reasonably matches the particular attribute with respect to its intent. Specifically, the database 606 could contain respective machine-understandable representations of semantic meanings of attributes, and the software application 610 could have access to those attributes and representations. Given this, the software application 610 could determine, by way of the natural language understanding unit 608, a semantic meaning of the particular portion. And the software application 610 could then leverage the natural language understanding unit 608 to identify a particular attribute, from among those stored in the database 606, having a semantic meaning that is within a similarity threshold of the semantic meaning of the particular portion. Other implementations are also possible.

Yet further, the software application 610 could use various techniques to carry out a particular conversation flow in accordance with a particular attribute.

In one example implementation, the software application 610 could determine the particular attribute as discussed, and could then responsively initiate the particular conversation flow at a particular conversational state that is associated with the particular attribute. In some cases, the particular conversational state may be the initial conversational state at which the particular conversation flow is arranged to initiate by default. In other cases, the particular conversational state may be a conversation state of the particular conversation flow that is different from its initial conversational state. In any case, the particular conversational state may be associated with the particular attribute if the particular conversational state one during which the software application 610 is arranged to receive, provide, record, and/or modify information related the particular attribute, among other options.

By way of example, the above-described "check IT ticket status" conversation topic may correspond to a conversation flow that defines a transition from an initial conversational state to a second conversational state, and perhaps also defines other states and transitions therebetween. In the initial conversational state, the software application 610 may be configured to transmit, to the computing device 602 and via the virtual agent interface 612, a prompt "please provide an incident number", so as to effectively request a user to provide an identifier of an incident record via the virtual agent interface 612. In the second conversational state, the software application 610 may be configured to transmit, to the computing device 602 and via the virtual agent interface 612, information indicating a status of an incident record associated with the identifier provided by the user during the initial conversational state.

In this example, the software application 610 could receive, from the computing device 602 and via the virtual agent interface 612, a conversation expression "what is the status for INC644575?" provided by a user The software application 610 could analyze this conversation expression according to the topic-determination process, so as to determine the "check IT ticket status" conversation topic. Additionally, the software application 610 could apply the attribute-extraction process to determine that "INC644575" is an identifier of an incident record that is included in the conversational expression. As a result, the software application 610 may initiate the "check IT ticket status" conversation flow at the second conversational state rather than at the initial conversational state. In doing so, the software application 610 may provide a verification prompt "you want to check the status of INC644575, correct?" and/or may automatically provide information indicating a status of the incident record. In this way, the software application 610 may avoid unnecessarily prompting the user at the initial conversational state and may instead immediately provide the information at issue, thereby streamlining the user's interaction with the virtual agent interface 612. Other examples are also possible.

In another example implementation, the software application 610 could determine the particular attribute corresponding to a portion of a conversational expression as discussed, and could responsively transition from a current conversational state of the particular conversation flow to a particular conversational state that is associated with the particular attribute. The current conversational state may be a conversational state that is being executed by the software application 610 at a time that the software application 610 receives the conversational expression. As such, the current conversational state could be the initial or another conversational state of the particular conversation flow, and the particular conversational state may be a different conversational state to which the software application 610 can transition from the current conversational state in accordance with the particular conversation flow.

By way of example, the above-described "open IT ticket" conversation topic may correspond to a conversation flow that defines a transition from an initial conversational state to a second conversational state as well as a further transition from the second conversational state to a third conversational state, and perhaps also defines other states and transitions therebetween. In the initial conversational state, the software application 610 may be configured to transmit, to the computing device 602 and via the virtual agent interface 612, a prompt "would you like to open a new IT ticket?" In the second conversational state, the software application 610 may be configured to transmit, to the computing device 602 and via the virtual agent interface 612, a prompt "how urgent is your issue?" In the third conversational state, the software application 610 may be configured to transmit, to the computing device 602 and via the virtual agent interface 612, a prompt "please describe the issue".

During the initial conversational state, the software application 610 may receive, via the virtual agent interface 612, a conversation expression "yes, I want to open a new ticket and I need help ASAP" provided by a user. The software application 610 could then apply the attribute-extraction process to determine that "ASAP" matches a priority level "1" with respect to its intent, where the "1" priority level is pre-defined by the remote network management network to indicate a high urgency for an incident record. As a result, after receiving the conversational expression, the software application 610 may responsively transition from the initial conversational state to the third conversational state rather than to the second conversational state. In this way, the software application 610 may avoid unnecessarily prompting the user at the second conversational state when the user already indicated the urgency, and may instead record the "1" priority level for the new incident record and proceed to provide the prompt "please describe the issue", thereby streamlining the user's interaction with the virtual agent interface 612. Other examples are also possible.

In yet another example implementation, carrying out a particular conversation flow in accordance with a particular attribute may involve the software application 610 automatically carrying out action(s) associated with the particular attribute during the particular conversation flow. The software application 610 could feasibly carry out such action(s) during any conversational state of the particular conversation flow. And the software application 610 could automatically carry out such action(s) without a user necessarily providing a request, via the virtual agent interface 612, that the software application 610 carry out those action(s), which could save the user significant time and effort.

In any case, the action(s) associated with the particular attribute could involve the software application 610 (i) textually or verbally providing, via the virtual agent interface 612, information related to the particular attribute, (ii) recording, in the database 606 and in association with the managed network, information related to the particular attribute, and/or (iii) modifying, in the database 606, information related to the particular attribute, among other possibilities. In more specific examples, if the particular attribute is the above-mentioned "1" priority level, then the associated action(s) could involve the software application 610 automatically (i) indicating, via the virtual agent interface 612, that a particular incident record has the "1" priority level, (ii) recording the "1" priority level for a new incident record as described, and/or (iii) modifying a priority level of an existing incident record to be the "1" priority level, among other options. Other examples are also possible.

In yet a further aspect, the software application 610 may also be configured to add new conversational expression(s) to the mappings 616 over time. In particular, a user could provide a new conversational expression that is not included in the mappings 616, and the software application 610 could then determine in various ways whether or not to add, to the mappings 616, an association between the new conversational expression and a certain conversation topic. In practice, such addition of new conversational expression(s) could improve the topic-determination process over time.

For example, the software application 610 may receive a new conversational expression and may then prompt a user to select a conversation topic, such as due to the software application 610 determining multiple possible conversation topics using the topic-determination process as described above, for instance. In some cases, the software application 610 could determine that one of the conversation topics is selected and could generate an association between the new conversational expression and the selected conversation topic. In other cases, the software application 610 could generate the association at issue only if the software application 610 also determines that a conversation flow corresponding to the selected conversation topic has been completed. In any case, the software application 610 could store this generated association as part of the mappings 616. In this way, if the software application 610 again receives the new conversational expression in the future, the software application 610 could use this association to determine the conversation topic without prompting the user to select a conversation topic. Other examples and advantages are also possible.

VII. Example Operations

FIG. 8 is a flow chart illustrating an example embodiment. The process illustrated by FIG. 8 may be carried out by a computing system, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve providing, by a software application and to a computing device associated with a managed network, a virtual agent interface, where persistent storage is disposed within a remote network management platform associated with the managed network, where the persistent storage contains: (i) a plurality of pre-defined conversation flows respectively corresponding to conversation topics, wherein the pre-defined conversation flows respectively define conversational states and transitions therebetween, and (ii) pre-defined mappings that respectively associate the conversation topics to one or more conversational expressions with matching semantic meanings.

Block 802 may involve receiving, by the software application and from the computing device, a textual or verbal conversational expression, where receiving the textual or verbal conversational expression occurs by way of the virtual agent interface.

Block 804 may involve determining, by the software application and by way of a natural language understanding unit, a particular semantic meaning of the textual or verbal conversational expression.

Block 806 may involve, based on the pre-defined mappings, determining, by the software application, a particular conversation topic associated with a particular conversational expression, the particular conversational expression having a matching sematic meaning that is within a similarity threshold of the particular semantic meaning of the textual or verbal conversational expression.

Block 808 may involve, in response to determining the particular conversation topic, carrying out, by the software application and by way of the virtual agent interface, a particular conversation flow of the pre-defined conversation flows that corresponds to the particular conversation topic.

In some embodiments, the virtual agent interface may be configured to textually or verbally communicate with a user.

In some embodiments, determining the particular conversation topic associated with the particular conversational expression may involve: comparing the particular semantic meaning to semantic meanings of the conversational expressions; and determining that the particular semantic meaning and the matching sematic meaning are within the similarity threshold.

In some embodiments, the software application may be further configured to, while carrying out a different conversation flow of the pre-defined conversation flows, (i) receive the textual or verbal conversational expression, (ii) determine the particular semantic meaning, and (iii) determine the particular conversation topic. In such embodiments, carrying out the particular conversation flow in response to determining the particular conversation topic may involve, in response to determining the particular conversation topic while carrying out the different conversation flow, switching from carrying out the different conversation flow to carrying out the particular conversation flow.

In some embodiments, the software application may be further configured to: (i) based on the pre-defined mappings, determine a different conversation topic associated with a different conversational expression, the different conversational expression having a different matching sematic meaning that is also within the similarity threshold of the particular semantic meaning; (ii) in response to determining both the particular conversation topic and the different conversation topic, provide, by way of the virtual agent interface, an option to select the particular conversation topic or the different conversation topic; and (iii) after providing the option, receive, by way of the virtual agent interface, an indication that the particular conversation topic is selected. In such embodiments, carrying out the particular conversation flow may be further in response to receiving the indication that the particular conversation topic is selected.

In some embodiments, the pre-defined mappings may include a plurality of conversational expressions each respectively associated with one of the conversation topics. The software application may be further configured to make a determination that the particular conversational expression is the only conversational expression, from among the plurality of conversational expressions, with a matching sematic meaning that is within the similarity threshold of the particular semantic meaning. In such embodiments, carrying out the particular conversation flow may be further in response to making the determination.

In some embodiments, the software application may be further configured to: determine a particular attribute that corresponds to at least a particular portion of (i) the textual or verbal conversational expression or (ii) a different conversational expression received during the particular conversation flow; and carry out the particular conversation flow in accordance with the particular attribute.

In such embodiments, the particular attribute may be representative of one or more of: (i) a particular time, (ii) a particular date, (iii) a particular location, (iv) a particular entity, or (v) a particular configuration item of the managed network.

Additionally or alternatively, the persistent storage may also contain a plurality of records related to issues with configuration items of the managed network, and the particular attribute may be associated with a particular record of the plurality of records. The particular attribute associated with the particular record may include one or more of: (i) a unique identifier of the particular record, (ii) a priority level of the particular record, (iii) a state of the particular record, (iv) a description of the particular record, or (v) a category of the particular record.

Additionally or alternatively, the software application may also have access to a plurality of attributes with matching semantic meanings, the plurality of attributes being respectively associated with remote network management platform or with the managed network. The software application may be further configured to determine, by way of the natural language understanding unit, a semantic meaning of the particular portion. In this case, determining the particular attribute that corresponds to at least the particular portion may involve identifying the particular attribute, from among the plurality of attributes, based on the particular attribute having a matching sematic meaning that is within a similarity threshold of the semantic meaning of the particular portion.

Additionally or alternatively, the software application may also have access to a plurality of attributes respectively associated with remote network management platform or with the managed network, and determining the particular attribute that corresponds to at least the particular portion may involve determining that the particular attribute, from among the plurality of attributes, matches the particular portion.

Additionally or alternatively, carrying out the particular conversation flow in accordance with the particular attribute may involve: in response to determining the particular attribute, initiating the particular conversation flow at a particular conversational state that is defined by the particular conversation flow and that is associated with the particular attribute. The particular conversation flow may define an initial conversational state at which the particular conversation flow is arranged to initiate by default, and the particular conversational state might be different from the initial conversational state.

Additionally or alternatively, the software application may be further configured to receive the different conversational expression during a current conversational state of the particular conversation flow, where the particular portion is of the different conversational expression. Carrying out the particular conversation flow in accordance with the particular attribute may involve: in response to determining the particular attribute, transitioning from the current conversational state to a particular conversational state that is defined by the particular conversation flow and that is associated with the particular attribute.

Additionally or alternatively, carrying out the particular conversation flow in accordance with the particular attribute may involve carrying out, during the particular conversation flow, one or more of: (i) textually or verbally providing, by way of the virtual agent interface, information related to the particular attribute, (ii) recording, in the persistent storage and in association with the managed network, information related to the particular attribute, or (iii) modifying, in the persistent storage, information related to the particular attribute.

In some embodiments, the particular conversation topic may correspond to a particular information technology (IT)-related issue, and the particular conversation flow may respectively define conversational states and transitions therebetween related to actions for remediating the particular IT-related issue.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
persistent storage disposed within a remote network management platform associated with a managed network, wherein the persistent storage contains:
(i) a plurality of pre-defined conversation flows respectively corresponding to conversation topics, wherein the pre-defined conversation flows respectively define conversational states and transitions therebetween,
(ii) pre-defined mappings that respectively associate the conversation topics to one or more conversational expressions with matching semantic meanings, and
(iii) a plurality of records related to issues with configuration items of the managed network; and
a software application associated with the remote network management platform, wherein the software application has access to the pre-defined conversation flows and to the pre-defined mappings, and wherein the software application is configured to:
provide, to a computing device associated with the managed network, a virtual agent interface,
receive, from the computing device and by way of the virtual agent interface, a textual or verbal conversational expression,
determine, by way of a natural language understanding unit, a particular semantic meaning of the textual or verbal conversational expression,
based on the pre-defined mappings, determine a particular conversation topic associated with a particular conversational expression, wherein the particular conversation topic corresponds to a particular information technology (IT)-related issue, wherein a particular conversation flow respectively defines conversational states and transitions therebetween related to actions for remediating the particular IT-related issue, and wherein the particular conversational expression has a matching sematic meaning that is within a similarity threshold of the particular semantic meaning of the textual or verbal conversational expression,
determine a particular attribute that corresponds to at least a particular portion of (i) the textual or verbal conversational expression or (ii) a different conversational expression received during the particular conversation flow, wherein the software application also has access to a plurality of attributes respectively associated with remote network management platform or with the managed network, wherein determining the particular attribute that corresponds to at least the particular portion comprises determining that the particular attribute, from among the plurality of attributes, matches the particular portion, wherein the particular attribute is associated with a particular record of the plurality of records and comprises one or more of: (i) a unique identifier of the particular record, (ii) a priority level of the particular record, wherein the software application is configured to transition from a first conversational state to a second conversational state based on the priority level of the particular record, (iii) a state of the particular record, (iv) a description of the particular record, or (v) a category of the particular record, and
in response to determining the particular conversation topic, carry out, by way of the virtual agent interface, a particular conversation flow of the pre-defined conversation flows that corresponds to the particular conversation topic in accordance with the particular attribute.

2. The computing system of claim 1, wherein determining the particular conversation topic associated with the particular conversational expression comprises:
comparing the particular semantic meaning to semantic meanings of the conversational expressions; and
determining that the particular semantic meaning and the matching sematic meaning are within the similarity threshold.

3. The computing system of claim 1,
wherein the software application is configured to, while carrying out a different conversation flow of the pre-defined conversation flows, (i) receive the textual or verbal conversational expression, (ii) determine the particular semantic meaning, and (iii) determine the particular conversation topic, and
wherein carrying out the particular conversation flow in response to determining the particular conversation topic comprises, in response to determining the particular conversation topic while carrying out the different conversation flow, switching from carrying out the different conversation flow to carrying out the particular conversation flow.

4. The computing system of claim 1,
wherein the software application is configured to:
based on the pre-defined mappings, determine a different conversation topic associated with a different conversational expression, the different conversational expression having a different matching sematic meaning that is also within the similarity threshold of the particular semantic meaning,
in response to determining both the particular conversation topic and the different conversation topic, provide, by way of the virtual agent interface, an option to select the particular conversation topic or the different conversation topic, and
after providing the option, receive, by way of the virtual agent interface, an indication that the particular conversation topic is selected, and
wherein carrying out the particular conversation flow is in response to receiving the indication that the particular conversation topic is selected.

5. The computing system of claim 1,
wherein the pre-defined mappings include a plurality of conversational expressions each respectively associated with one of the conversation topics,
wherein the software application is configured to make a determination that the particular conversational expression is the only conversational expression, from among the plurality of conversational expressions, with a matching sematic meaning that is within the similarity threshold of the particular semantic meaning, and
wherein carrying out the particular conversation flow is in response to making the determination.

6. The computing system of claim 1, wherein the particular attribute is representative of one or more of: (i) a particular time, (ii) a particular date, (iii) a particular location, (iv) a particular entity, or (v) a particular configuration item of the managed network.

7. The computing system of claim 1,
wherein the software application also has access to a plurality of attributes with matching semantic meanings, the plurality of attributes being respectively associated with remote network management platform or with the managed network, wherein the software application is configured to determine, by way of the natural language understanding unit, a semantic meaning of the particular portion, and
wherein determining the particular attribute that corresponds to at least the particular portion comprises identifying the particular attribute, from among the plurality of attributes, based on the particular attribute having a matching sematic meaning that is within a similarity threshold of the semantic meaning of the particular portion.

8. The computing system of claim 1, wherein carrying out the particular conversation flow in accordance with the particular attribute comprises:
   in response to determining the particular attribute, initiating the particular conversation flow at a particular conversational state that is defined by the particular conversation flow and that is associated with the particular attribute.

9. The computing system of claim 8, wherein the particular conversation flow defines an initial conversational state at which the particular conversation flow is arranged to initiate by default, and wherein the particular conversational state is different from the initial conversational state.

10. The computing system of claim 1, wherein the software application is configured to receive the different conversational expression during a current conversational state of the particular conversation flow, wherein the particular portion is of the different conversational expression, and wherein carrying out the particular conversation flow in accordance with the particular attribute comprises:
   in response to determining the particular attribute, transitioning from the current conversational state to a particular conversational state that is defined by the particular conversation flow and that is associated with the particular attribute.

11. The computing system of claim 1, wherein carrying out the particular conversation flow in accordance with the particular attribute comprises carrying out, during the particular conversation flow, one or more of:
   (i) textually or verbally providing, by way of the virtual agent interface, information related to the particular attribute,
   (ii) recording, in the persistent storage and in association with the managed network, information related to the particular attribute, or
   (iii) modifying, in the persistent storage, information related to the particular attribute.

12. A method comprising:
   providing, by a software application and to a computing device associated with a managed network, a virtual agent interface, wherein persistent storage is disposed within a remote network management platform associated with the managed network, wherein the persistent storage contains:
      (i) a plurality of pre-defined conversation flows respectively corresponding to conversation topics, wherein the pre-defined conversation flows respectively define conversational states and transitions therebetween,
      (ii) pre-defined mappings that respectively associate the conversation topics to one or more conversational expressions with matching semantic meanings, and
      (iii) a plurality of records related to issues with configuration items of the managed network;
   receiving, by the software application and from the computing device, a textual or verbal conversational expression, wherein receiving the textual or verbal conversational expression occurs by way of the virtual agent interface;
   determining, by the software application and by way of a natural language understanding unit, a particular semantic meaning of the textual or verbal conversational expression;
   based on the pre-defined mappings, determining, by the software application, a particular conversation topic associated with a particular conversational expression, wherein the particular conversation topic corresponds to a particular information technology (IT)-related issue, wherein a particular conversation flow respectively defines conversational states and transitions therebetween related to actions for remediating the particular IT-related issue, and wherein the particular conversational expression has a matching sematic meaning that is within a similarity threshold of the particular semantic meaning of the textual or verbal conversational expression;
   determining a particular attribute that corresponds to at least a particular portion of (i) the textual or verbal conversational expression or (ii) a different conversational expression received during the particular conversation flow, wherein the software application also has access to a plurality of attributes respectively associated with remote network management platform or with the managed network, wherein determining the particular attribute that corresponds to at least the particular portion comprises determining that the particular attribute, from among the plurality of attributes, matches the particular portion, wherein the particular attribute is associated with a particular record of the plurality of records and comprises one or more of: (i) a unique identifier of the particular record, (ii) a priority level of the particular record, wherein the software application is configured to transition from a first conversational state to a second conversational state based on the priority level of the particular record, (iii) a state of the particular record, (iv) a description of the particular record, or (v) a category of the particular record; and
   in response to determining the particular conversation topic, carrying out, by the software application and by way of the virtual agent interface, a particular conversation flow of the pre-defined conversation flows that corresponds to the particular conversation topic in accordance with the particular attribute.

13. An article of manufacture including a non-transitory computer-readable medium, having stored thereon program instructions that, upon execution by a computing system, cause the computing system to perform operations, wherein the computing system includes persistent storage disposed within a remote network management platform that is associated with a managed network, the operations comprising:
   providing, by a software application and to a computing device associated with the managed network, a virtual agent interface, wherein the persistent storage contains:
      (i) a plurality of pre-defined conversation flows respectively corresponding to conversation topics, wherein the pre-defined conversation flows respectively define conversational states and transitions therebetween,
      (ii) pre-defined mappings that respectively associate the conversation topics to one or more conversational expressions with matching semantic meanings, and (iii) a plurality of records related to issues with configuration items of the managed network;

receiving, from the computing device and by way of the virtual agent interface, a textual or verbal conversational expression, determining, by way of a natural language understanding unit, a particular semantic meaning of the textual or verbal conversational expression;

based on the pre-defined mappings, determining a particular conversation topic associated with a particular conversational expression, wherein the particular conversation topic corresponds to a particular information technology (IT)-related issue, wherein a particular conversation flow respectively defines conversational states and transitions therebetween related to actions for remediating the particular IT-related issue, and wherein the particular conversational expression has a matching sematic meaning that is within a similarity threshold of the particular semantic meaning of the textual or verbal conversational expression;

determining a particular attribute that corresponds to at least a particular portion of (i) the textual or verbal conversational expression or (ii) a different conversational expression received during the particular conversation flow, wherein the software application also has access to a plurality of attributes respectively associated with remote network management platform or with the managed network, wherein determining the particular attribute that corresponds to at least the particular portion comprises determining that the particular attribute, from among the plurality of attributes, matches the particular portion, wherein the particular attribute is associated with a particular record of the plurality of records and comprises one or more of: (i) a unique identifier of the particular record, (ii) a priority level of the particular record, wherein the software application is configured to transition from a first conversational state to a second conversational state based on the priority level of the particular record, (iii) a state of the particular record, (iv) a description of the particular record, or (v) a category of the particular record; and in response to determining the particular conversation topic, carrying out, by way of the virtual agent interface, a particular conversation flow of the pre-defined conversation flows that corresponds to the particular conversation topic in accordance with the particular attribute.

* * * * *